United States Patent
Hsieh

(10) Patent No.: US 8,915,287 B2
(45) Date of Patent: Dec. 23, 2014

(54) CHAIN DRUM LOCKING MECHANISM FOR MANUAL ROLLING DOOR OPERATOR

(71) Applicant: Chung-Hsien Hsieh, New Taipei (TW)

(72) Inventor: Chung-Hsien Hsieh, New Taipei (TW)

( * ) Notice: Subject to any disclaimer, the term of this patent is extended or adjusted under 35 U.S.C. 154(b) by 0 days.

(21) Appl. No.: 14/277,912

(22) Filed: May 15, 2014

(65) Prior Publication Data

US 2014/0342864 A1 Nov. 20, 2014

(30) Foreign Application Priority Data

May 15, 2013 (TW) .............................. 102117153 A

(51) Int. Cl.
 E06B 9/78 (2006.01)
 F16H 55/30 (2006.01)
 F16H 37/02 (2006.01)

(52) U.S. Cl.
 CPC .............. *F16H 55/30* (2013.01); *F16H 37/027* (2013.01)
 USPC ............ 160/297; 160/120; 160/302; 160/308

(58) Field of Classification Search
 USPC .......... 160/297, 120, 302, 133, 291, 307, 308
 IPC .......................... E06B 9/78,9/82, 9/90, 2009/90
 See application file for complete search history.

(56) References Cited

U.S. PATENT DOCUMENTS

| | | | | |
|---|---|---|---|---|
| 3,243,023 A * | 3/1966 | Boyden | ...................... | 192/223.2 |
| 3,637,004 A * | 1/1972 | Wardlaw et al. | ............... | 160/133 |
| 4,250,942 A * | 2/1981 | Dreher et al. | ................. | 160/297 |
| 4,253,554 A * | 3/1981 | Nisenson | ................... | 192/223.2 |
| 4,345,636 A * | 8/1982 | Fukuchi | ........................ | 160/297 |
| 5,099,906 A * | 3/1992 | Chigusa et al. | ............... | 160/297 |
| 5,392,887 A * | 2/1995 | Nisenson | ................... | 192/223.2 |
| 5,586,631 A * | 12/1996 | Benthin | ...................... | 192/223.2 |
| 6,029,735 A * | 2/2000 | Nicholson | ...................... | 160/321 |
| 7,051,782 B2 * | 5/2006 | Nichols et al. | ................ | 160/310 |
| 7,055,283 B2 * | 6/2006 | Hsieh | .............................. | 49/139 |
| 7,152,653 B1 * | 12/2006 | Kubly et al. | .................. | 160/120 |
| 7,600,553 B2 * | 10/2009 | Bresson | ........................ | 160/301 |
| 2013/0074409 A1 | 3/2013 | Hsieh | .............................. | 49/139 |

FOREIGN PATENT DOCUMENTS

TW 1422737 1/2014

* cited by examiner

*Primary Examiner* — David Purol

(74) *Attorney, Agent, or Firm* — Bui Garcia-Zamor; Jessica H. Bui, Esq.

(57) ABSTRACT

A stationary base plate, a chain drum locking mechanism and a reducer mechanism are provided for a manual rolling door operator, in which the reducer mechanism has an output shaft and the chain drum locking mechanism has a chain drum, a wedge wheel, a drive shaft, a plurality of moving rollers, and fixed rods. If the chain drum is rotated in any direction by a force pulling a chain run around the chain drum, the fixed rods push against the moving rollers to release a wedging action from the wedge wheel which simultaneously renders the drive shaft to be rotated. However, if the force stop to pull the chain, the wedge wheel locks the moving roller by the wedging action due to the weight of a curtain of slats so as to stop the rotation of the drive shaft.

4 Claims, 5 Drawing Sheets

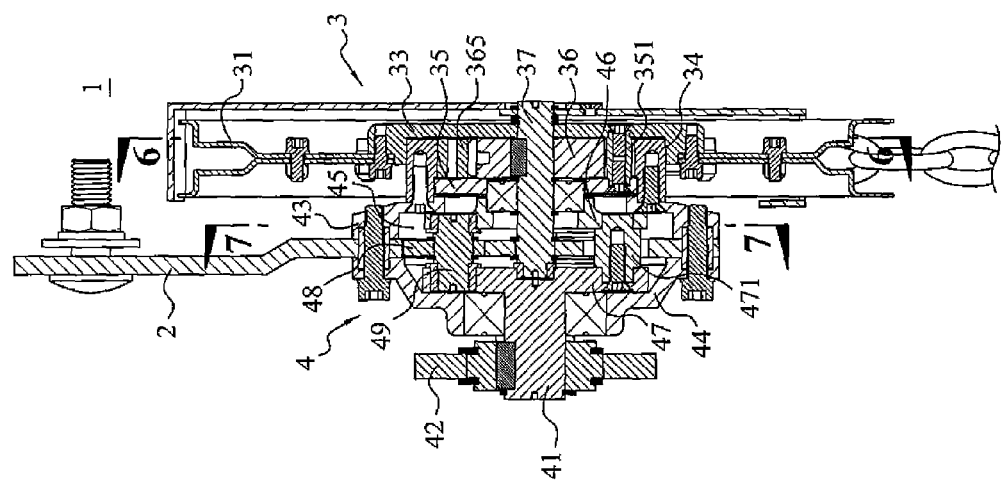
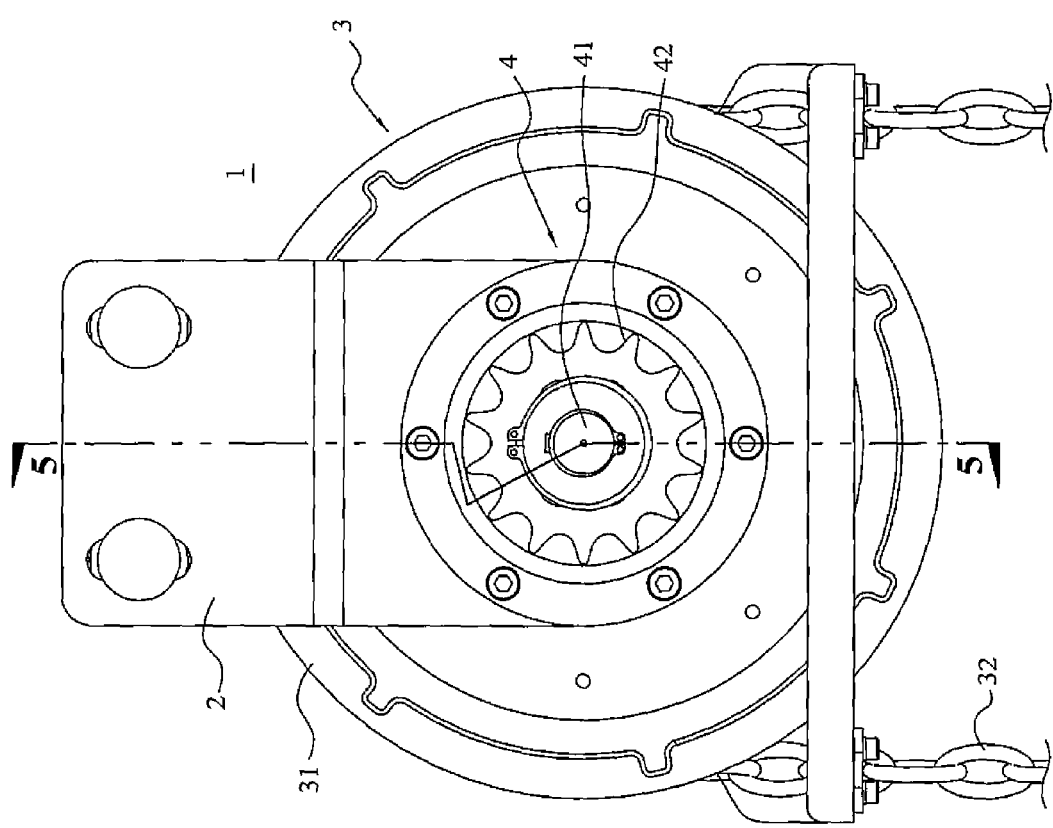
FIG. 5
FIG. 4

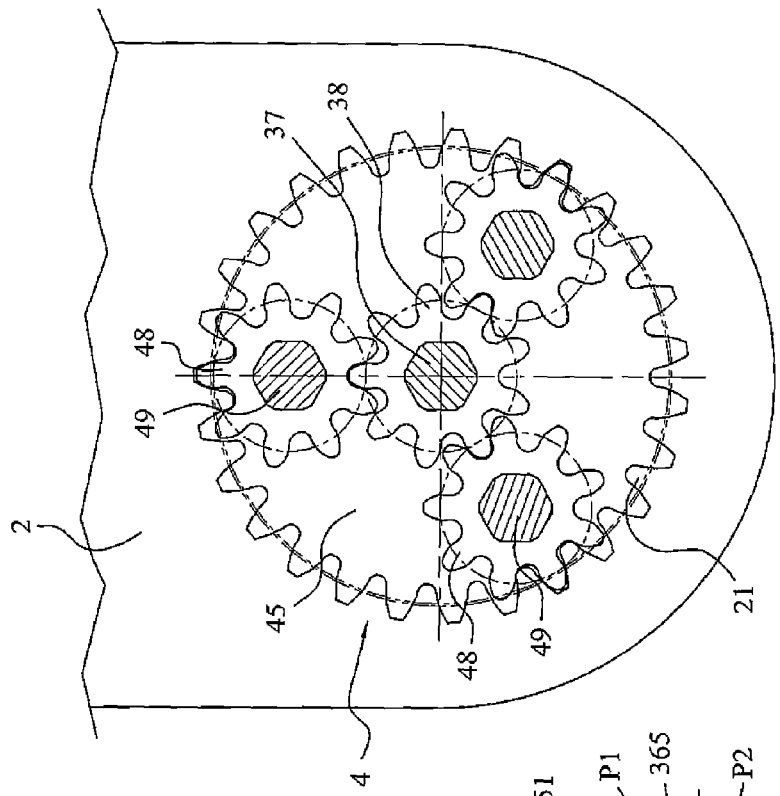
FIG. 7
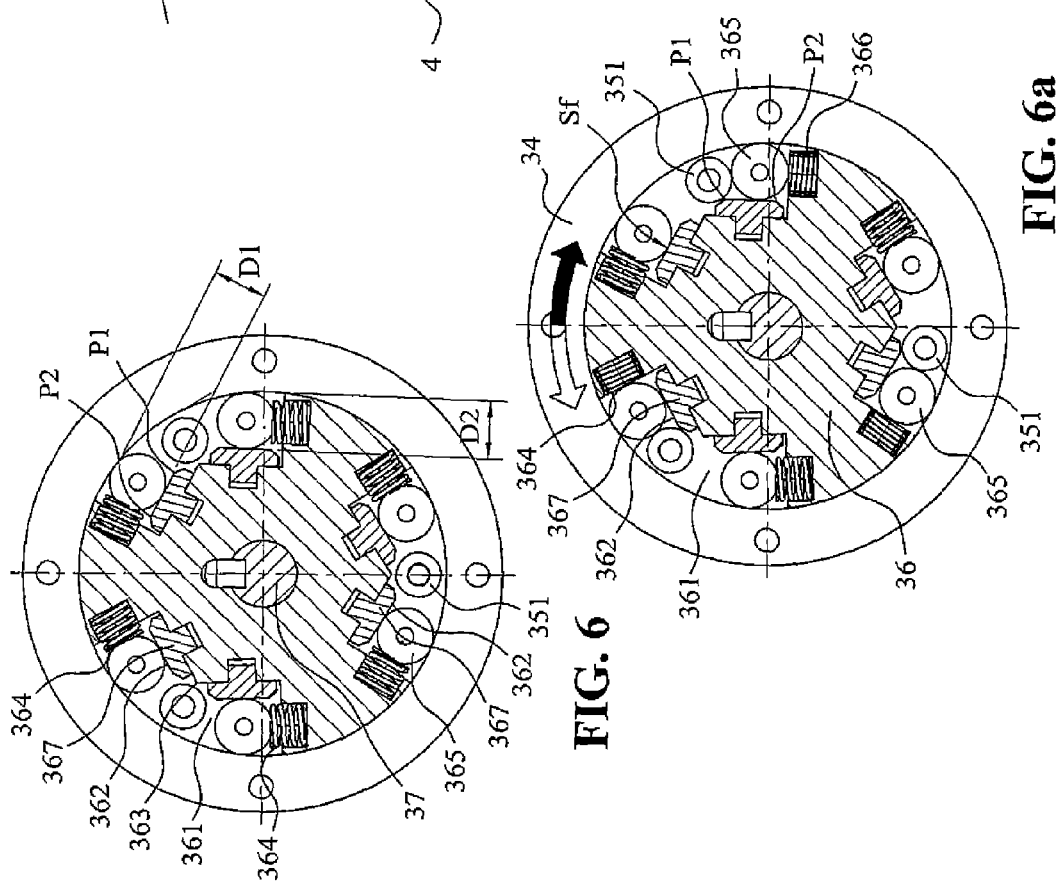
FIG. 6
FIG. 6a

CHAIN DRUM LOCKING MECHANISM FOR MANUAL ROLLING DOOR OPERATOR

BACKGROUND OF THE INVENTION

1. Field of the Invention

The present invention relates to a chain drum locking mechanism for a manual rolling door operator, such that when a force is exerted on a chain to rotate the chain drum, a curtain of rolling door can be lifted up or lowered down; but when the exerting of the force is stopped, the rolling door can be locked immediately.

2. Brief Description of Prior Arts

For a conventional rolling door operator, it is always provided with a preloading mechanism according to the weight of a curtain of slats, to balance partial weight of the door slats. For example, the weight of the preloading weight is controlled between +35 and −35 lbs. Within this range, when manually pushing the door curtain upward or drawing the door curtain downward, manual operation of the rolling door is very easy to conduct.

Furthermore, the conventional door operator is often provided with a brake device. It is true that the brake device can stop free dropping of the curtain of door slats when manual force exertion is stopped. However a clutch mechanism is needed to release the brake device from locking when the curtain of door slats is to start to operate. As such, this kind of the mechanism of the door operator not only is complicated, bulky and inconvenience in change-over of operation, but also its cost is high and failure rate is high.

For example, a Taiwanese Patent Application No. 100134526 (corresponding to U.S. patent application Ser. No. 13/354,368) entitled "Door machine having chain disk locking mechanism" and filed by the inventor of the present invention, discloses an electric door operator, comprising an electric motor, having a drive shaft; and a chain drum locking mechanism, mainly comprising a chain drum, a wedge wheel, a stationary shaft and a plurality of moving rollers. The chain drum comprises a chain wheel, a wall drum, a central recessed socket and a plurality of fixed rods. The wall drum is fixed at one side of the chain wheel and has a central axial aperture. The chain wheel includes a hollow cavity in which the central recessed socket is freely to be received, and the central recessed socket is fixed on an outer case body and defines a central circular bore. The plural fixed rods are axially located within the central circular bore and are fixed on the wall drum. The wedge wheel is received within the central circular bore, and includes a plurality of axial open slots corresponding to the plurality of fixed rods, each axial open slot including one first end face and two second end faces, in which the two second end faces are respectively provided at two sides of the first end face. The first end face is spaced from the inner wall of the central circular bore by a first pitch, and the second end faces are spaced from the inner wall of the central circular bore by a second pitch respectively, in which the first pitch is smaller than the second pitch. Further, one end of a stationary shaft is pivotally connected to the drive shaft of the electric motor, and the other end of the stationary shaft passes freely through the central axial bore of the chain drum and is fixed to the wedge wheel. The plurality of moving rollers are respectively received in the plurality of axial open slots of the wedge wheel, and are interposed between the second end faces within the inner walls of the central circular bore. The diameter of each moving roller is larger than the first pitch and is smaller than the second pitch. The diameter of each fixed rods is smaller than the first pitch. When the chain drum is rotated, the plurality of fixed rods push against the moving rollers so as to move the wedge wheel and simultaneously to rotate the drive shaft; when the stationary shaft is to be rotated, the first end face of the wedge wheel and the inner wall of the central circular bore lock the plurality of moving rollers, so that the stationary shaft is unable to rotate.

Under a manual operation mode of the electric door operator, when the chain drum is manually pulled, the rolling door is lifted up or lowered down; when the pulling is stopped, the brake is in action and is locked so that the rolling door is unable to be lifted up or lowered down. Hence, there is no need to use a conventional clutch for change-over. Therefore, not only the clutch mechanism can be omitted to reduce cost but also the elements of the mechanism can be simplified and assembly as well as maintenance is easier. Thus, the lifetime can be prolonged.

Furthermore, the inventor contemplates to allow the chain drum locking mechanism to combine with a planetary reduction mechanism, so that a simple manual rolling door operator is formed with the component parts fewer and the volume smaller.

SUMMARY OF THE INVENTION

The main object of this invention is to provide a chain drum locking mechanism for manual rolling door operator, whereby, when the chain drum is pulled, the curtain of slats of the rolling door is lifted up or lowered down; and when the pulling of a chain is stopped, the curtain of slats of rolling door stops immediately at desired position without free dropping. Hence, there is no need to use conventional clutch for change-over.

Another object of the present invention is to provide a chain drum locking mechanism for manual rolling door operator, whereby a conventional clutch mechanism can be omitted, the structure thereof can be simplified, the assembly as well as the maintenance thereof is more easier, and the lifetime can be prolonged.

Still another object of the present invention is to provide a chain drum locking mechanism for manual rolling door operator, in which the chain drum locking mechanism is received in a central circular bore to cooperate the planetary reduction mechanism. Hence, the size of the rolling door operator can be made to be flattened and compact to be enable to be received in a limited space.

In order to achieve the above and the other objects, the chain drum locking mechanism for manual rolling door operator according to the present invention is provided, which comprises a stationary base plate, a chain drum locking mechanism, and a reduction mechanism. The reduction mechanism has an output shaft. The chain drum locking mechanism comprises a chain drum, a central recessed socket, a ring socket, a drive shaft, a wedge wheel, a plurality of fixed rods and a plurality of moving rollers. The central recessed socket is fixed on one side of the chain drum, and the central recessed socket has a central axial bore and an accommodation cavity. The ring socket is freely received within said accommodation cavity and is fixed to the stationary base plate, and the ring socket defines a central circular bore with the central recessed socket. The drive shaft has one end pivotally provided in the central axial bore of the central recessed socket, and the other end coupled to the output shaft of the reduction mechanism. The wedge wheel is fixed on the drive shaft and is received within the central circular bore. The wedge wheel includes a plurality of axial slots each of which includes two end portions and a protrusion interposed between the intersection of the two end portions, each end face having one side proximate to the protrusion having a first distance spaced from the inner wall of the central circular bore, and the other side far from the protrusion having a second distance spaced from the inner wall of the central circular bore, the first distance being smaller than the second distance. The stationary socket is received freely within the central circular bore and is located at the opposite side of the central recessed socket. A plurality of fixed rods are located in the plurality of axial slots. Each fixed rod is interposed between the protrusion and the inner wall of the central circular bore, and is fixed on the end face of the stationary socket opposite to the central recessed socket. A plurality of moving rollers are respectively received within the plurality of axial slots. Each moving roller is interposed between one of the end portions and the inner wall of the central circular bore.

Furthermore, the diameter of each moving roller is larger than the first distance and is smaller than the second distance, while the diameter of each fixed rod is smaller than the first pitch. When the chain drum is rotated, the plurality of fixed rods push the moving rollers so as to move the wedge wheel and simultaneously to rotate the drive shaft. When the rotation of chain drum stops, the end face portions of the wedge wheel and the inner wall of the central circular bore lock the plurality of moving rollers so that the driving shaft is unable to rotate.

Preferably, each of the axial slots includes two side walls respectively, and is provided with two liners respectively provided with a face having two end portions thereof; one end portion being vertically spaced from a corresponding point on the inner wall of the central circular bore by a first distance, the other end portion being vertically spaced from another corresponding point on the inner wall of the central circular bore by a second distance, and the first distance being smaller than the second distance. Each of the side walls has a compression spring assembled thereon to push the plurality of moving rollers away from the side walls. In this manner, the plurality of compression springs can push the plurality of moving rollers closely to the protrusion between the two end portions, so that the plurality of moving rollers can be locked in the first distance so as to lock the drive shaft. Therefore, the drive shaft is unable to rotate freely with respect to the chain drum.

Furthermore, the present invention comprises a planetary reduction mechanism. The stationary base plate has an annular gear. The reduction mechanism comprises: a first end drum located at one side of the annular gear and fixed to the stationary base plate; a second end drum located at the other side of the annular gear and fixed to the first end drum with each other, which defines a hollow accommodation cavity; a first wheel drum having a through aperture at its center, which is received within the accommodation cavity and located at one side of the annular gear; an output shaft having its first end extending in the accommodation cavity and having a second wheel drum integrally provided therewith; the second wheel drum and the first wheel drum being installed at the other side of the annular gear, and the second wheel drum and the first wheel drum being fixed together by a plurality of fixing pins, the output shaft having its second end extending along the outside of the second end drum and fixed with an output wheel; moreover, a plurality of planetary gears, via a plurality of pivot pins, pivotally disposed equiangularly on the opposite end faces of the first wheel drum and the second wheel drum and being meshed with the annular gear; and a drive shaft being pivotally installed in the through aperture of the first wheel drum, a sun gear correspondingly provided at the center of the annular gear being connected fixedly on the second end of the drive shaft, and the sun gear being meshed with the plurality of planetary gears. In this manner, the plurality of planetary gears rotating on the annular gear in spin and revolution. The implementation of planetary reduction mechanism not only has the advantages of small volume, light weight, high transmission efficiency, large loading capacity and compact size, but also controls the winding speed of lift-up or lower-down of the curtain of door slats.

BRIEF DESCRIPTION OF ACCOMPANYING DRAWINGS

The present invention will be better understood by the detailed description of a preferred embodiment with reference to the accompanying drawings, in which:

FIG. 4 is a schematic view showing the application of the chain drum locking mechanism of the present invention in the manual rolling door operator.

FIG. 5 is a longitudinally sectional view taken along line 5-5 of FIG. 4.

FIG. 6 is a sectional view taken along line 6-6 of FIG. 5, in which the drive shaft in locking state is shown.

FIG. 6a is a view showing that the drive shaft of FIG. 6 is in non-locking state, in which the arrow direction indicates the direction of force application on the chain drum.

FIG. 7 is a sectional view taken along line 7-7 of FIG. 5, in which a schematic view of a planetary reduction mechanism is shown.

DETAILED DESCRIPTION OF PREFERRED EMBODIMENTS

Figure 1:
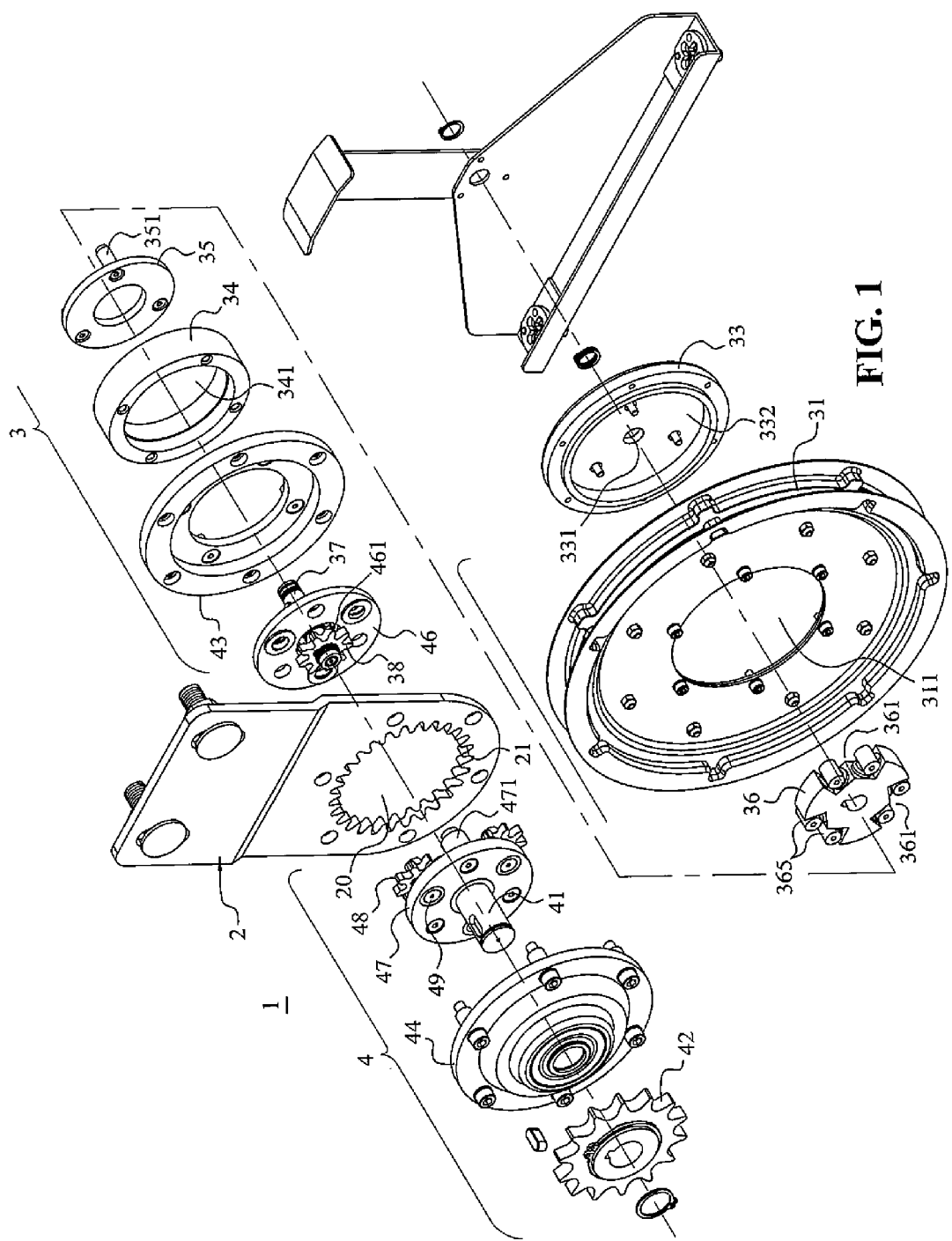
FIG. 1 is a perspective exploded view of a manual rolling door operator relevant to the chain drum locking mechanism of the present invention.
Figure 3:
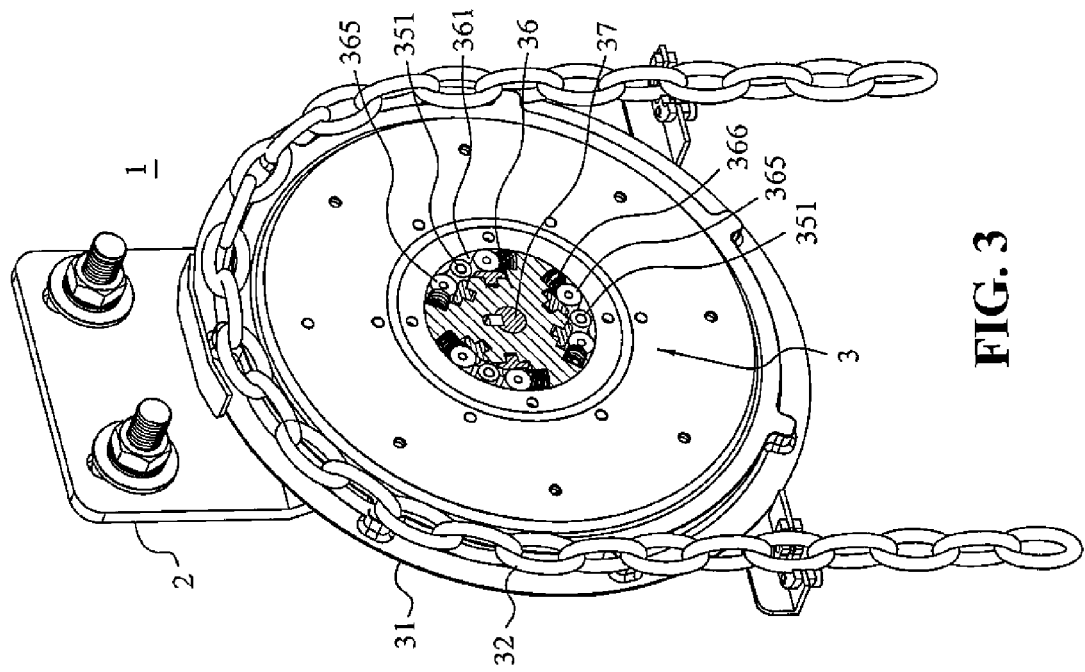
FIG. 3 is a perspective view of the manual rolling door operator of FIG. 2 viewed from another direction, in which it is partially sectioned and a chain runs along the chain drum.
Figure 2:
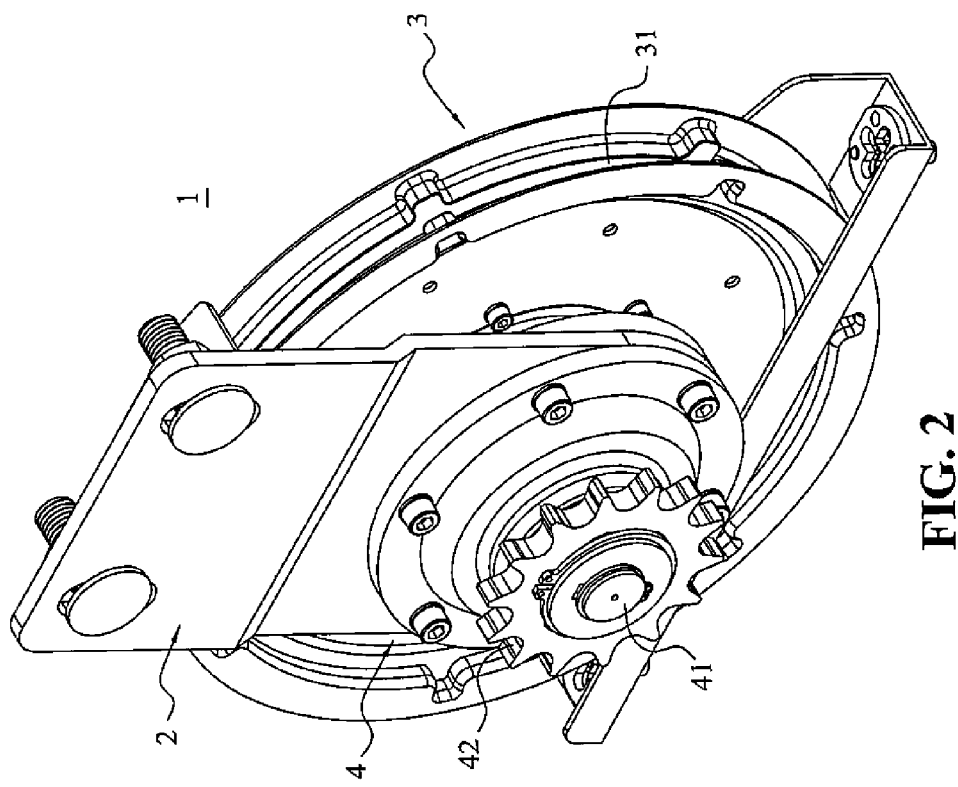
FIG. 2 is a perspective view of the manual rolling door operator of FIG. 1 of the present invention in assembled state.
Figure 8:
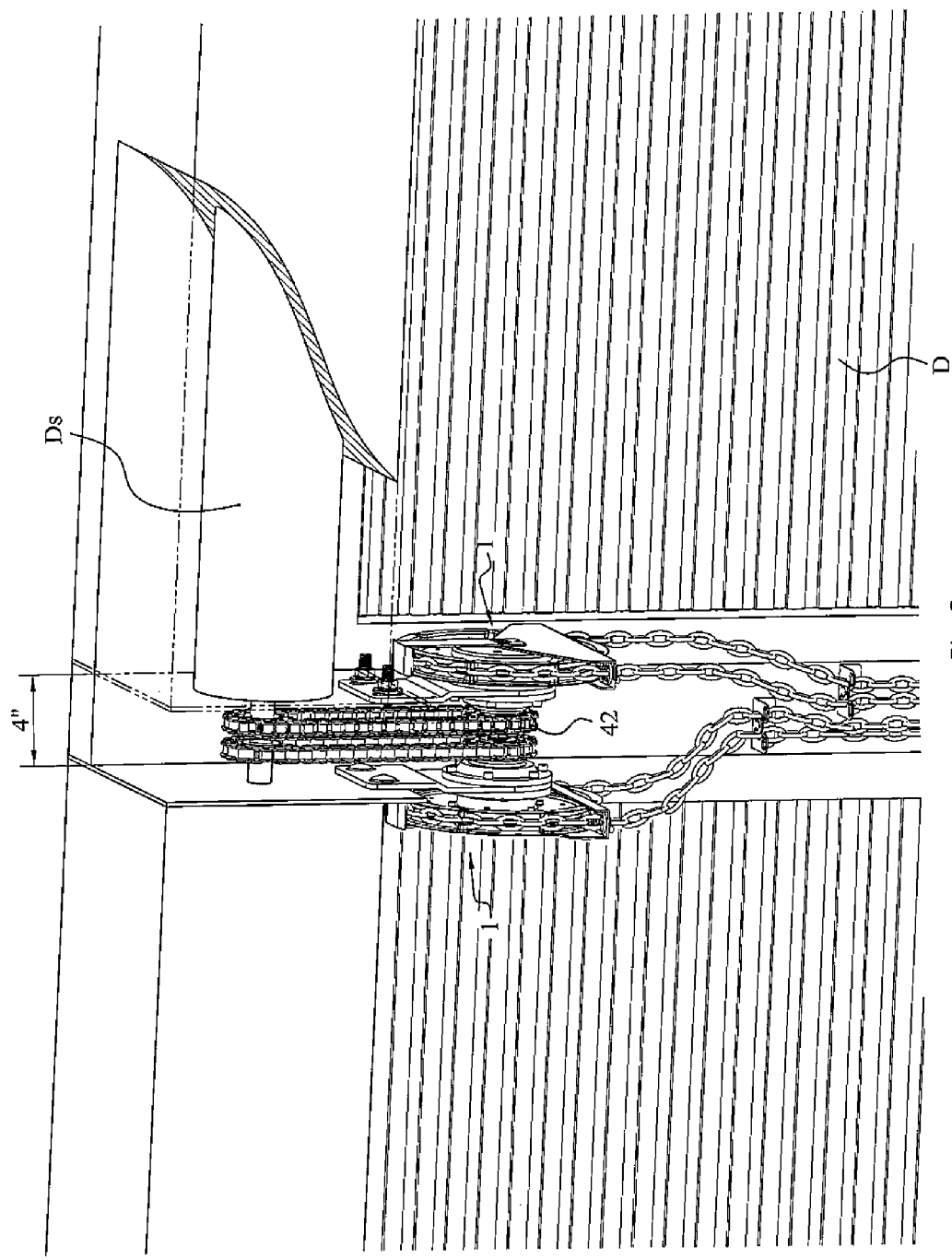
FIG. 8 is a schematic view showing the state of use of the manual rolling door operator in which the chain drum locking mechanism of the present invention is applied.

Firstly, referring to FIGS. 1 to 3, a preferred embodiment of a chain drum locking mechanism for manual rolling door operator of the present invention is shown. As shown, the rolling door operator 1 mainly comprises a stationary base plate 2, a chain drum locking mechanism 3, and a reduction mechanism 4. The chain drum locking mechanism 3 is fixed on one side of the stationary base plate 2, and the reduction mechanism 4 is installed on the other side of the stationary base plate 2. An output shaft 41 is extended from the reduction mechanism 4, and an output wheel 42 is provided on the output shaft 41. The output wheel 42 is usually connected with a winding barrel Ds (as shown in FIG. 8) for a curtain of slats of rolling door through a chain, in which the reduction mechanism 4 is usually used to reduce the speed of lift-up and lower-down of the curtain of door slats (as shown in FIG. 8) driven by the output wheel 42.

Referring to FIGS. 2 to 6 and 6a, the chain drum locking mechanism 3 mainly comprises a chain drum 31, a central recessed socket 33, and a ring socket 34. The chain drum 31 has a central aperture 311. The central recessed socket 33 is fixed on the right side of the chain drum 31 (as seen from FIG. 1), and has a central axial bore 331 and an accommodation cavity 332. The ring socket 34 has one end passing through the central aperture 311 and is loose fitted within the accommodation cavity 332, and the other end of the ring socket 34 is fixed to the stationary base plate 2. The ring socket 34 defines a central circular bore 341. Although the chain drum 31 and the central recessed socket 33 are shown separately for the purpose of illustration, they can be integrally formed together if desired. A drive shaft 37 has its right end passing through the central circular bore 341 of the ring socket 34 and is pivotally provided in the central axial bore 331 of the central recessed socket 33, and the left end of the drive shaft 37 is coupled to the output shaft 41 of the reduction mechanism 4.

A wedge wheel 36 is fixed on the drive shaft 37 and is received within the central circular bore 341. The wedge wheel 36 includes a plurality of axial slots 361, and as shown in the embodiment, the number of the axial slots 361 is set three, for example. The three axial slots 361 are equidistantly spaced, each of the axial slots 361 including two bottom surfaces 362 separated by a central protrusion 363. Preferably, liners 367 are respectively provided on the two bottom surfaces 362, each liner 367 having a face Sf, the opposite sides of the face Sf being formed respectively as a first end portion P1 and a second end portion P2. The first portion P1 is proximate to the central protrusion 363 of the axial slot 361 and the second end portion P2 is far from the central 363 of the axial slot 361. The first end portion P1 is vertically spaced from a corresponding point on the inner wall of the central circular bore 341 by a first distance D1, and the second end portion P2 is vertically spaced from another corresponding point on the inner wall of the central circular bore 341 by a second distance D2, the first distance D1 being smaller than the second distance D2.

A stationary socket 35 with three fixed rods 351 extending axially is received within the central circular bore 341. The three fixed rods 351 pass through the three axial slots 361 of the wedge wheel 36 and are fixed on the bottom surfaces of the accommodation cavity 332 of the central recessed socket 33. Further, six moving rollers 365 in pairs, are received within the three axial slots 361 of the wedge wheel 36, each moving roller 365 being interposed in a space between the bottom surface 362 and the inner wall of the central circular bore 341. The diameter of each moving roller 365 is larger than the first distance D1 and is smaller than the second distance D2, while the diameter of each fixed rod 351 is smaller than the first distance D1. As such, each fixed rod 351 can be moved freely in the whole axial slot 361, each moving roller 365 is limited and locked by the first distance D1 but only can be slided in the direction of the second distance D2. Further, each of the axial slots 361 includes two side walls 364 respectively located at two sides of the axial slot 361 and adjacent to the second end portion P2 of the two bottom surfaces 362 respectively. Each of the side walls 364 has a compression spring 366 assembled thereon to push the pair of moving rollers 365 away from the side walls 364.

Furthermore, referring to FIG. 7, a planetary reduction mechanism 4 is shown for the chain drum locking mechanism 3 of the present invention. Referring to FIG. 1, the stationary base plate 2 includes a through hole 20 provided with an annular gear 21. The reduction mechanism 4 comprises a first end drum 43 located at the right side of the stationary base plate 2, on which the ring socket 34 of the chain drum locking mechanism 3 is fixed; and a second end drum 44 located at the left side of the stationary base plate 2. The second end drum 44 is fixed to the first end drum 43 with each other with the stationary base plate 2 fixed between the second end drum 44 and the first end drum 43. The first end drum 43, the second end drum 44 and the through hole 20 of the stationary base plate 2 define a hollow accommodation cavity 45, as shown in FIG. 7. A first wheel drum 46 having a through aperture 461 at the center, is received within the accommodation cavity 45. The second end of the drive shaft 37 passes through the aperture 461. A second wheel drum 47 is received within the accommodation cavity 45. The output shaft 41 is extended from one side of the second wheel drum 47. The other side of the second wheel drum 47 is fixed to the first wheel drum 46 by a plurality of fixing pins 471. The output shaft 41 extends from the second end drum 44 and is fixed with the output wheel 42 which is coupled to the barrel Ds for the curtain of slats of the rolling door D, as shown in FIG. 8. Three planetary gears 48 are disposed equidistantly on the second wheel drum 47 and pivot on pivot pins 49 within a space defined by the first wheel drum 46 and the second wheel drum 47, and are meshed with the annular gear 21 of the stationary base plate 2. A sun gear 38 is fixed on the left side of the driving shaft 37 and is disposed among the three planetary gears 48 and are engaged therewith. In this manner, the three planetary gears 48 revolve on the annular gear 21, and hence the rotational speed of output wheel 42 from the sun gear 38 is reduced by spin or revolution of the planetary gears 48.

An operation of the chain drum locking mechanism of the present embodiment is shown in FIG. 6a. When the chain drum 31 is rotated in the clockwise direction as indicated by the black arrow, the three fixed rods 351 of the station socket 35 can push the three moving rollers 365 so that the three moving rollers 365 resist against the compression springs 366 disposed on the end walls 364 and slide in the direction of the larger second distance D2 at the second end portion P2 of the bottom surfaces 362 of slots. Hence, the moving rollers 365 rotate the wedge wheel 36 on the drive shaft 37 in the clockwise direction. On the contrary, when the chain drum 31 is rotated in counterclockwise direction as indicated by the white arrow, the three fixed rods 351 push the three moving rollers 365 to resist against the compression springs 366 disposed on the end walls 364 and slide in the direction of the smaller distance D1 at the second end portion P2 of the bottom surfaces 362 of slots. Hence, the moving rollers 365 rotate the wedge wheel 36 on the drive shaft 37 in the counterclockwise direction. However, when the chain drum 31 stops rotation either in the clockwise direction or the counter clockwise direction, the three moving rollers 365 are again moved by the corresponding compression springs 366 away from the side end walls 364 so as to slide and to be locked on the smaller first distance D1. Hence, the drive shaft 37 is locked without further ring rotation.

As such, according to this invention, a chain drum is integrated with a locking mechanism to omit a conventional clutch mechanism for a rolling door operator, and hence this invention can lock the door of slats from self dropping when a manual power is not exerted on the rolling door. Further, a planetary reduction mechanism for deceleration cooperates to control the winding or dewinding speed of lift-up or lower-down of the curtain of door slats. Therefore, the volume of the rolling door operator of the present invention can be made to be flattened and compact in such a manner as to be received in a limited space as shown in FIG. 8. Moreover, as the construction of the structure is simple, the lifetime is significantly prolonged as high as over three hundred thousands times in switching-on and switching-off operation, and this is verified by experiment.

While the present invention has been described by preferred embodiments in conjunction with accompanying drawings, it should be understood the embodiments and the drawings are merely for descriptive and illustrative purpose, not intended for restriction of the scope of the present invention. Equivalent variations and modifications conducted by person skilled in the art without departing from the spirit and scope of the present invention should be considered to be still within the scope of the present invention.

The invention claimed is:

1. A chain drum locking mechanism for a manual rolling door operator comprising a stationary base plate (2), a drive shaft (37), and a reducer mechanism (4), the stationary base plate (2) including a through hole (20) that has an annular gear (21) provided therein; and a first end drum (43) and a second and drum (44) provided at both sides of the stationary base plate (2) respectively, so that an accommodation cavity (45) is defined;

the drive shaft (37) having one end extending out of the first end drum (43) and the other end passing through the accommodation cavity (45) and connected to a sun gear (38);

the reducer mechanism (4) having an output shaft (41) one end of which is fixed with a wheel drum (47) and the other end of which extends out of said second end drum (44) and is coupled to a winding barrel (Ds) of a curtain of slats of a rolling door (D); and a plurality of planetary gears (48) pivoted on said wheel drum (47) around the sun gear (38) to spin and to rotate on said annular gear (21), wherein the chain drum locking mechanism (3) includes:

a chain drum (31) which has a central aperture (311) and is mounted on the one end of the drive shaft (37);

a central recessed socket (33) fixed on one side face of the chain drum (31), and having an accommodation cavity (332);

a ring socket (34) with a central circular bore (341) formed therein, the ring socket (34) passing through the central aperture (311) of the chain drum (31) and being received within the accommodation cavity (332);

a wedge wheel (36) fixed on the drive shaft (37) and received within the central circular bore (341), the wedge wheel (36) including a plurality of axial slots (361) each of which includes two bottom surfaces (362), each bottom surface (362) having a first end portion (P1) proximate to the center of the axial slot (361) and a second end portion (P2) far away from the center of the axial slot (361), the first end portion (P1) being vertically spaced from a point on the inner wall of the central circular bore (341) by a first distance (D1) and the second end portion (P2) being vertically spaced from another point on the inner wall of said central circular bore (341) by a second distance (D2), the first distance (D1) being smaller than the second distance (D2);

a stationary socket (35) with a plurality of fixed rods (351) extending in an axial direction, the stationary socket (35) being received within the central circular bore (341) with the plurality of fixed rods (351) passing through the plurality of axial slots (361) of the wedge wheel (36) and being fixed on the bottom surfaces of the accommodation cavity (332) of the central recessed socket (33);

a plurality of moving rollers (365) respectively received within the plurality of axial slots (361) of the wedge wheel (36); a diameter of each moving roller (365) being larger than the first distance (D1) and being smaller than the second distance (D2), a diameter of each fixed rod (351) being smaller than the first distance (D1); so that when the chain drum (31) is rotated, the fixed rods (351) push the moving rollers (365) so as to move the wedge wheel (36) and simultaneously to rotate the driving shaft (37); and when the chain drum (31) is not rotated, the first end portions (P1) on the bottom surfaces (362) of the axial slots of the wedge wheel (36) and the inner walls of the central circular bore (341) locking the plurality of moving rollers (365) from the driving shaft (37) being unable to rotate.

2. The chain drum locking mechanism for the manual rolling door operator as claimed in claim 1, wherein the reducer mechanism (4) further comprises: a first wheel drum (46) and a second wheel drum (47), the first wheel drum (46) having a through aperture (461) through which the drive shaft (37) passes; and the second wheel drum (47) being integrated with the one end of the output shaft (41);

the plurality of planetary gears (48), via a plurality of pivot pins (9), being equidistantly pivoted between the first wheel drum (46) and the second wheel drum (47), and being engaged with the annular gear (21); and the sun gear (38).

3. The chain drum locking mechanism for the manual rolling door as claimed in claim 1, wherein each of the axial open slots (361) includes two side walls (364) respectively adjacent to the second end portions (P2) of the two bottom surfaces (362) of the slots (361), each the side wall (364) has a compression spring (366) assembled thereon to push the plurality of moving rollers (365) away from the side wall (364).

4. The chain drum locking mechanism for the manual rolling door operator as claimed in claim 3, wherein each bottom surface (362) of the axial slots (361) is provided with a liner (367), the liner (367) having a face (Sf) the opposite sides of which are formed respectively as the first end portion (P1) and the second end portion (P2).

* * * * *